Nov. 28, 1939.    G. H. SCHMIDT    2,181,156
TORCH
Filed June 30, 1936
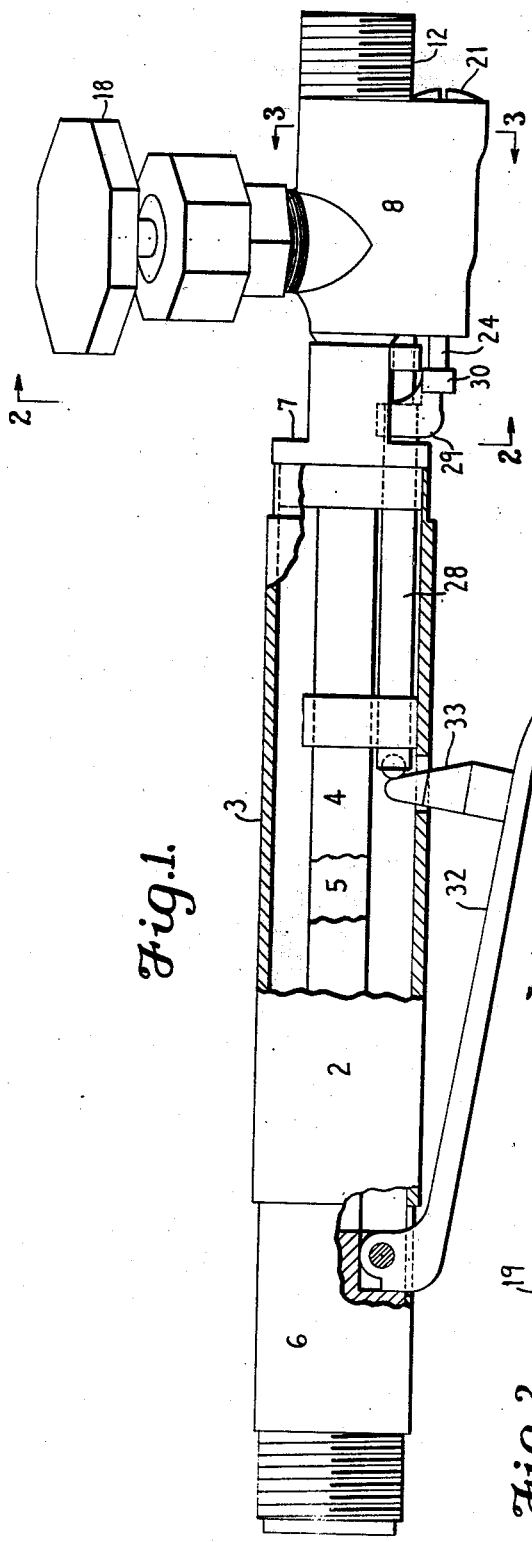
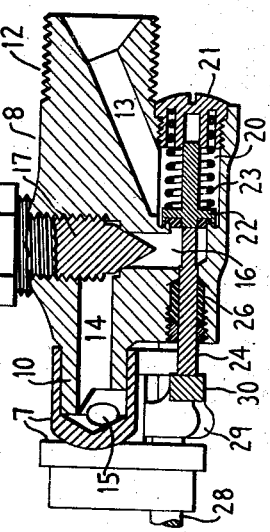
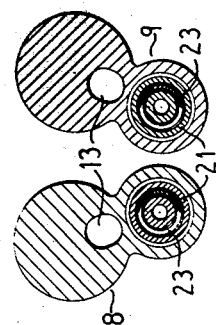
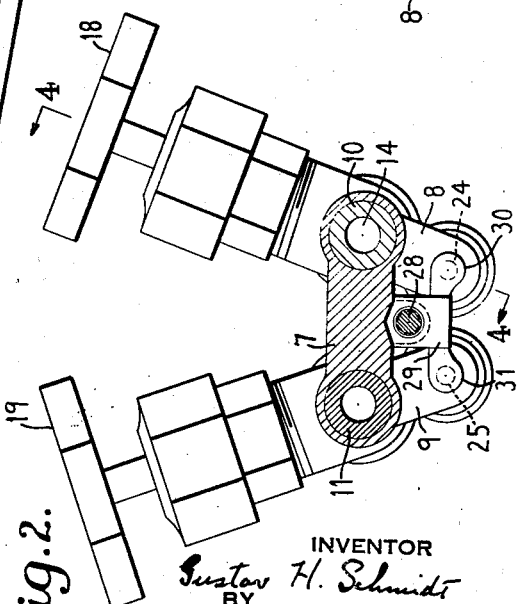
INVENTOR
Gustav H. Schmidt
BY
ATTORNEY Patented Nov. 28, 1939

2,181,156

UNITED STATES PATENT OFFICE 2,181,156

TORCH

Gustav H. Schmidt, Wood-Ridge, N. J., assignor to Air Reduction Company, Incorporated, New York, N. Y., a corporation of New York Application June 30, 1936, Serial No. 88,136

4 Claims. (Cl. 158—27.4)

This invention relates to welding or heating torches which have quick shut-off valve mechanism for shutting off the flow of both gases (oxygen and fuel gas) without disturbing the control valves by which adjustment can be made for the gas flows.

There have been quick shut-off attachments for application to ordinary, existing torches, but such attachments make the torch cumbersome and inconvenient to handle. The present invention is of that class in which the quick shut-off means is part of the torch. Various torch constructions of this general kind have been known. The object of this invention is to provide a construction which will not merely perform the function, but will be easy to manufacture, sturdy in its valve mechanism, very compact and of good balance, and convenient and economical when it comes to maintenance or replacement of valve parts.

In accordance with the invention herein exemplified the quick shut-off valves and the control valves are both located in the rear end of the torch, and each shut-off valve is longitudinally disposed so as to be unseated by rear-end thrust, and is built compactly and accessibly into the same body with the corresponding control valve. In accordance with another feature of the invention each combination of a control valve and a shut-off valve is incorporated in a valve body which is separate from another valve body containing the other control valve and the other shut-off valve, both shut-off valves, however, being conjointly operated. Other features of the invention will become apparent as the specification proceeds.

In the accompanying drawing showing the preferred embodiment of the invention:

Fig. 1 is a side view of a welding torch, minus the mixer and tip, with portions broken away and in section, and embodying the invention;

Fig. 2 is a section taken on the line 2—2 of Fig. 1;

Fig. 3 is a section taken on the line 3—3 of Fig. 1; and

Fig. 4 is a section taken on the line 4—4 of Fig. 2.

The torch body 2 has a handle casing 3 through which pass tubes 4, 5 for conducting, respectively, oxygen and fuel gas (such as acetylene, for example) to the head 6. Provisions for mixing the gases and for conducting the mixture to the tip exit are well known and need not be illustrated.

At the rear part of the torch, the torch body has a block or casting 7 which contains passages, one for oxygen and one for fuel gas, and which is socketed at its front end to receive the rear ends of the tubes 4 and 5. This block is secured to the handle casing in a suitable manner.

Two valve bodies 8 and 9 have necks 10 and 11 which are socketed into the rear end of the block 7, the connections being permanent as far as the use of the torch is concerned but permitting of dismantling for purpose of repair. The rear end of each valve body has a threaded inlet 12 for the reception of a hose connection.

In each valve body there is a passageway for one of the two gases. Such passageways may be more or less conventional. As shown in Fig. 4, the valve body 8 has an inclined inlet passage 13 extending forward from its rear end, a longitudinal outlet passage 14, which communicates by way of a port 15 with one of the two separate passages in the block 7, and an intermediate, transverse passage 16. At the junction of the passages 16 and 14 there is a seat or shoulder with which coacts a needle-type control valve element 17 having a handle 18. The other valve body 9 has similar passages and a similar control valve, represented by the handle 19. The control valves are disposed transversely to the axis of the torch in the usual manner.

The under portions of the valve bodies 8 and 9 are slightly enlarged to accommodate the quick shut-off valves. This part of the construction is duplicated in the two valve bodies, so that it will suffice to describe the construction shown in the section of the valve body 8 in Fig. 4.

A longitudinal valve chamber 20 is formed in the body 8 immediately under the passage 13, which opens into this chamber. At the rear end, the chamber 20 is closed by a readily removable back cap 21 adjacent the inlet boss 12. At the front end of this valve chamber, near the junction with the cross passage 16, there is a valve seat lip, against which a longitudinally acting shut-off valve element 22 is seated by a spring 23, this spring being interposed, under compression, between the valve element and the back cap.

The shut-off valve element 22 can be unseated by a push pin 24 which passes through a stuffing-box 26 and projects from the front wall of the lower portion of the valve body. It will be understood that there is a similar push pin and shut-off valve in the other valve body 9. In Fig. 2 the two push pins for the two shut-off valves are indicated by the broken-line circles marked 24 and 25.

The two shut-off valves can be simultaneously opened through the medium of a longitudinal push rod 28 guided inside the handle of the torch and in the block 7, the rear portion of this rod carrying a thrust piece 29 having two arms 30 and 31 opposed to the two push pins 24 and 25. The push rods 28 can be thrust rearward to unseat the shut-off valves by means of a lever 32 having a cam 33 to act on the forward end of the rod. The operating device may be made self-holding or latching, if desired. When the lever is released the springs 23 close both shut-off valves.

I claim:

1. A torch comprising a body with a handle portion and housing structure at the rear end of the torch for enclosing two control valves and two quick-acting shut-off valves, each of the control valves being in series with one of the shut-off valves in a gas conduit through the torch, each of said shut-off valves being movable in its housing structure longitudinally of the torch, a valve-operating plunger extending forward from each shut-off valve through a front wall of the housing structure at a region accessible from outside of the torch, a stuffing-box in said front wall and around each plunger, a cap at the back of each shut-off valve removable from the housing structure to expose the valve through an accessible opening in the housing structure for convenient inspection or replacement of the valve, a manually-operated member on the handle portion of the torch, and motion transmitting means by which displacement of said member is transmitted to both of the shut-off valves.

2. A torch including two separate valve bodies located at the rearward end of the torch and comprising a part of the torch, a control valve and a longitudinally disposed, quick-acting shut-off valve in each of said valve bodies, a valve-operating plunger extending through an end wall of each valve body, a common thrust member operable to slide the plungers to operate the quick-acting shut-off valves, and a handle on the torch for actuating said thrust member.

3. In a heating or welding torch having a handle portion, separate passages for oxygen and fuel gas, and a control valve in each of said passages, the improvement which comprises a quick-acting shut-off valve in series with each of the control valves and located in the torch on the inlet side of the control valve, a valve-operating plunger extending through the valve body from each of said quick-acting shut-off valves, and means for sliding both of the plungers including a common operating member for both plungers on the handle portion of the torch.

4. A gas torch comprising a body having a handle portion, and two valve bodies at the rear end of the torch beyond the handle portion, conduits in the torch for two kinds of gas, a control valve in each of said valve bodies for controlling the passage of gas through the respective conduits, two quick-acting shut-off valves, one in series with each of the control valves and disposed longitudinally and accessibly in the same valve body adjacent the corresponding control valve, a valve-operating plunger extending through the wall of each valve body and slidable therein to actuate the shut-off valve, and a common operating member for both of said plungers, said operating member being located on the handle portion and being movable to slide both of the plungers in a direction to open the shut-off valves.

GUSTAV H. SCHMIDT.